(12) United States Patent
Liu et al.

(10) Patent No.: US 9,094,893 B2
(45) Date of Patent: Jul. 28, 2015

(54) METHOD AND APPARATUS FOR ESTABLISHING SERVICE ROUTE

(75) Inventors: Yang Liu, Shenzhen (CN); Yuqin Chen, Shenzhen (CN); Hongyun Qu, Shenzhen (CN); Ling Xu, Shenzhen (CN); Zhengguang Zhao, Shenzhen (CN); Yan Long, Shenzhen (CN); Xuming Fang, Shenzhen (CN); Xiaopeng Hu, Shenzhen (CN); Yue Zhao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 358 days.

(21) Appl. No.: 13/515,391

(22) PCT Filed: Jan. 12, 2010

(86) PCT No.: PCT/CN2010/070143
§ 371 (c)(1),
(2), (4) Date: Jun. 12, 2012

(87) PCT Pub. No.: WO2010/148655
PCT Pub. Date: Dec. 29, 2010

(65) Prior Publication Data
US 2012/0250563 A1    Oct. 4, 2012

(30) Foreign Application Priority Data
Dec. 24, 2009   (WO) ............... PCT/CN2009/076000

(51) Int. Cl.
*H04L 12/26*    (2006.01)
*H04W 40/12*    (2009.01)
*H04L 12/717*   (2013.01)

(52) U.S. Cl.
CPC .............. *H04W 40/12* (2013.01); *H04L 45/42* (2013.01)

(58) Field of Classification Search
None
See application file for complete search history.

(56) References Cited

U.S. PATENT DOCUMENTS

| | | | | |
|---|---|---|---|---|
| 5,159,593 | A * | 10/1992 | D'Amico et al. | 370/332 |
| 6,532,365 | B1 * | 3/2003 | Anderson et al. | 455/437 |
| 7,693,100 | B2 * | 4/2010 | Cho et al. | 370/328 |
| 7,969,927 | B2 * | 6/2011 | Yu et al. | 370/315 |
| 8,155,634 | B1 * | 4/2012 | Singh et al. | 455/418 |
| 8,295,235 | B2 * | 10/2012 | Varma et al. | 370/329 |
| 8,355,722 | B1 * | 1/2013 | Tailor et al. | 455/436 |

(Continued)

FOREIGN PATENT DOCUMENTS

| CN | 101483893 A | 7/2009 |
|---|---|---|
| CN | 101527947 A | 9/2009 |

(Continued)

OTHER PUBLICATIONS

P.R. China, State Intellectual Property Office, International Search Report for International Application No. PCT/CN2010/070143 mailed Oct. 8, 2010.

*Primary Examiner* — Steve Young
(74) *Attorney, Agent, or Firm* — Bright IP Law Offices

(57) ABSTRACT

The present invention discloses a method and an apparatus for establishing a service route, wherein the method comprises the steps of: collecting, by a control station, channel quality information of all links on each path of a terminal; according to the channel quality information, selecting an access station which establishes a route with the terminal. The present invention realizes selecting the access station which establishes a route with the terminal according to the actual application situation.

16 Claims, 8 Drawing Sheets

(56) References Cited

U.S. PATENT DOCUMENTS

| | | | |
|---|---|---|---|
| 8,670,716 B2* | 3/2014 | Yu et al. | 455/63.1 |
| 2002/0009059 A1* | 1/2002 | Abutaleb et al. | 370/318 |
| 2003/0053435 A1* | 3/2003 | Sindhushayana et al. | 370/342 |
| 2005/0037718 A1* | 2/2005 | Kim et al. | 455/101 |
| 2007/0019668 A1* | 1/2007 | Lee et al. | 370/458 |
| 2009/0197603 A1* | 8/2009 | Ji et al. | 455/436 |
| 2010/0157826 A1* | 6/2010 | Yu et al. | 370/252 |
| 2010/0220738 A1* | 9/2010 | Sarikaya | 370/401 |

FOREIGN PATENT DOCUMENTS

| | | |
|---|---|---|
| CN | 101610557 A | 12/2009 |
| WO | 2008105771 A1 | 4/2008 |

* cited by examiner

METHOD AND APPARATUS FOR ESTABLISHING SERVICE ROUTE

CROSS REFERENCE TO RELATED APPLICATIONS

This application is the U.S. National Stage of International Patent Application No. PCT/CN2010/070143 filed on Jan. 12, 2010, which claims priority to International Patent Application No. PCT/CN2009/076000 filed on Dec. 24, 2009. Both International Patent Applications are hereby incorporated by reference in their entirety.

FIELD OF THE INVENTION

The present invention relates to the field of communication, in particular to a method and an apparatus for establishing a service route.

BACKGROUND OF THE INVENTION

Generally, a wireless communication system uses electromagnetic waves to communicate with a fixed/mobile wireless communication terminal (for example, a cell phone or a laptop attached with a wireless communication card can be called a terminal). Generally, the terminals are located within the wireless coverage range of the system, and electromagnetic wave frequencies allocated to these terminals are divided into a plurality of carrier frequencies to serve as wireless communication channels. The wireless communication system adopts specified wireless channels to provide wireless coverage range within a geographical range through a Base Station (BS), and the geographical range is called a cell. Generally, the BS is located in the center of the cell.

The coverage range of a wireless network would be affected by various factors. For example, a high building might block the radio signal of the BS, thereby causing serious weakening of the signal within a certain region, and the signal at the edge of the cell would be weakened, thereby causing increase of reception error rate of the terminal. The capacity requirement of the wireless communication system also is affected by various factors. For example, when the number of users increases rapidly or a call traffic increases rapidly, the system capacity is required to be increased; however, in a remote area, the capacity of a BS generally can not be fully utilized within the coverage range, thus it is needed to expand the coverage range of the system so as to make full use of the redundant system capacity.

In order to expand the system coverage range or increase the system capacity, one or more Relay Stations (RSs) can be set between a BS supporting multi-hop relay and a terminal (hereinafter the wireless communication system comprising an RS is called a system). The RS can be used to relay the signal from the BS to the terminal (downlink) or from the terminal to the BS (uplink). After the RS is adopted, the signal transmission quality of the communication link can be effectively improved, so as to achieve the purpose of expanding the system coverage range or increasing the system capacity.

The communication path, through which the terminal accesses the BS via one hop RS or multi-hop RSs, is called a relay path. The RS directly connected with the terminal is called an access RS. The communication link between the access RS and the terminal is called an access link. On the relay path, the access RS can communicate with the BS through other RSs. On the relay path, the communication link between RSs or between RS and BS is called a relay link. The RS can be fixed, roaming or mobile.

FIG. 1 shows schematic diagrams of a conventional data sending mode and a Local Forwarding mode in a multi-hop system according to relevant art. The data communication path of a conventional cellular network is as shown in FIG. 1 (a), no matter how far two communicated Mobile Stations (MS) are away from a BS and how poor the link quality is, the MSs must establish a connection with the BS directly and occupy the system resources (since the link quality is poor, the utilization efficiency of the resources is very low, a lot of resources might be occupied to guarantee the needed Quality of Service (QoS) to communicate). The data communication path of a Mobile Multi-hop Relay (MMR) cellular network is as shown in FIG. 1 (b), for the communication between the MSs which are far away from the BS or are under poor link quality, the forwarding of an RS enables a single-hop path BS<->MS with poor link quality to be replaced by a two-hop link, MR-BS<->RS and RS<->MS, with good link quality, thus a high-order Modulate Code format Set (MCS) can be used to improve the utilization efficiency of the resources and to obtain a higher throughput performance. However, for two intercommunicated MSs, no matter how close they are, they must adopt the forwarding of the RS to transmit data to the MR-BS so as to perform communication. For the MS1 and the MS2 accessing the same RS, after the data of the MS1/MS2 are forwarded to the MR-BS by the RS, the MR-BS transmits the data back to the RS again, and then the RS transmits the data to the MS2/MS1, that is to say, the same data are forwarded back to the RS from the MR-BS after being forwarded to the MR-BS by the RS, thus unnecessary air interface overhead is caused and the utilization efficiency of the spectrum resources of the network is reduced. FIG. 1 (c) shows a data communication path in a Local Forwarding mode, the MSs in the same RS can intercommunicate directly through the forwarding of the RS, without forwarding data to the MR-BS, thus the air interface resources of the MR-BS are saved.

Since a user, when entering network, performing a secondary route selection and a handover, needs to select a proper cell, a proper sector and a proper station to perform access, so as to satisfy the QoS requirement of the user itself, a necessary path selection algorithm can maximize the resource utilization efficiency and the system capacity to satisfy the growing service requirement of the user on the premise of guaranteeing the QoS of the user.

For example, a newly joined MS must perform an action of Network Entry with an adjacent higher-level station to join the network, wherein this higher-level station can be an MR-BS, also can be an RS. When performing the action of Network Entry, the MS would monitor a Preamble of the higher-level station, synchronize with the higher-level station, and then perform an action of Initial Ranging. Generally, during the phase of the MS performing the action of Initial Ranging, the MS would select the adjacent station with strongest signal intensity to perform interaction; after a series of actions such as signal intensity adjustment, parameter setting and registration authentication are completed, the MS can join the network formally. Therefore, the MS accomplishing the action of Network Entry can communicate with the MR-BS.

FIG. 2 shows a schematic diagram for illustrating a control channel and a data channel in a Local Forwarding mode according to relevant art. As shown in FIG. 2, if the Local Forwarding technology is adopted, the signaling system still adopts the original non-shortcut mode, a series of signaling interaction comprising traffic statistic and charging information still would pass through the MR-BS, the operator still can fully monitor the network according to its own desire, in this way, the redesign of the signaling system due to the introduction of a novel technology is simplified, the Local Forwarding technology can be used with few changes. However, in order to improve the spectrum efficiency of the system, the data service adopts the shortcut mode to transmit, no longer being necessary to pass through the MR-BS.

Although the MS can determine the connected higher-level station by judging the signal intensity, however, only using the signal intensity as the criteria of route selection might not select a better path. It is necessary for us to take the resource utilization efficiency and the service condition of the user into account during the secondary route selection and the handover and make them the route selection criteria, so as to optimize the path selected by the user and make full use of the advantages of the Local Forwarding.

Before introducing a detailed routing algorithm, a timeslot utilization efficiency is first defined which is used to represent the link efficiency of each hop of link (a single-hop link or a relay link and an access link on a multi-hop path) on each optional path.

In the Institute for Electrical and Electronic Engineers (IEEE) 802.16 standard, a slot is the smallest time-frequency resource allocation unit in the system, and the resources that each user can obtain are an integer multiple of slots. According to the definition of the standard, in a 10 MHz-bandwidth 1024-Fast Fourier Transform Algorithm method (FFT) system, one slot comprises 48 data sub-carriers for transmitting data information of the user. The system adopts an adaptive modulation and coding technology, if a Signal Interference Noise Ratio (SINR) of the link can satisfy an MCS using M ($M=2^m$)-level modulation, with a coding rate of r, then one data sub-carrier on this link can carry m×r (bit) information, then we define $\eta(m,r,T_{frame})$ as the slot utilization efficiency.

$$\eta(m, r, T_{frame}) = \frac{48 \times m \times r}{T_{frame}} (Kbps/Slot) \quad (1)$$

In the above, $T_{frame}$ represents a frame length. The slot utilization efficiency actually represents a data rate that one slot can transmit.

Different MCSs correspond to different slot efficiencies, since different links have different link quality (SINR), and different SINR ranges correspond to different MCSs, thus formula (1) can also be expressed as follows:

$$\eta(m,r,T_{frame}) = \eta(SINR) \quad (2)$$

The MCSs and the slot efficiency corresponding to different SINR ranges are shown in Table 0.

TABLE 0

MCS Correspondence Table List

| MCS | SINR(dB) (PED-B: 3 km/h) | Slot Efficiency (Kbps/Slot) |
|---|---|---|
| QPSK(1/12) | −3.14 | 1.6 |
| QPSK(1/6) | −0.73 | 3.2 |
| QPSK(1/3) | 2.09 | 6.4 |
| QPSK(1/2) | 4.75 | 9.6 |
| QPSK(2/3) | 7.86 | 12.8 |
| 16QAM(1/2) | 9.94 | 19.2 |
| 16QAM(2/3) | 13.45 | 25.6 |
| 64QAM(2/3) | 18.6 | 38.4 |
| 64QAM(5/6) | 24.58 | 48.5 |

In the multi-hop relay cellular network, the MS can have multiple optional paths, and the MS can communicate with the BS directly, also can perform multi-hop communication through the forwarding of the RS. For a user u, provided there are $n_p(u)$ optional paths between the user u and the MR-BS totally.

$P_l(u)$ represents each optional path between the user u, and the MR-BS, wherein $l=1, 2, \ldots, n_p(u)$.

Provided there are $h_l(u)$ hops on the optional path $P_l(u)$ between the user u and the MR-BS, $P_l^i(u)$ is adopted to represent the $i^{th}$ hop of link on the path $P_l(u)$, wherein $i=1, 2, \ldots h_l(u)$.

$SINR_l^i(u)$ represents the SINR of the link $P_l^i(u)$, then $\eta(SINR_l^i(u))$ is the slot efficiency of the link $P_l^i(u)$.

However, at present, an access station which establishes a route with the terminal can not be selected according to actual application conditions.

SUMMARY OF THE INVENTION

The present invention provides a method and an apparatus for establishing a service route, so as to at least solve the problem above.

In view of the above, according to one aspect of the present invention, a method for establishing a service route is provided.

The method for establishing a service route according to the present invention comprises the steps of: a control station collecting channel quality information of all links on each path of a terminal; and selecting, according to the channel quality information, an access station which establishes a route with the terminal.

Preferably, the step of the control station collecting the channel quality information occurs when the terminal performs a secondary route selection, initiates a service, initiates a handover, or initiates a network re-entry, wherein the process of the terminal performing the secondary route selection comprises: during an initial network entry, the terminal accessing another control station according to an instruction of the control station.

Preferably, the channel quality information collected by the control station comprises: a Signal Interference Noise Ratio (SINR).

Preferably, when the terminal performs a secondary route selection or initiates a handover, the step of selecting the access station which establishes the route with the terminal according to the channel quality information comprises the steps of: determining, according to the SINR, an slot utilization efficiency through the following formula:

$$\eta(SINR) = \frac{48 \times m \times r}{T_{frame}} (Kbps/Slot),$$

wherein $\eta(SINR)$ is the slot utilization efficiency, m is a modulation parameter, r is a coding rate, and $T_{frame}$ is a frame length; and selecting an access station corresponding to a maximum slot utilization efficiency determined according to the channel quality information as the access station which establishes the route with the terminal.

Preferably, after the step of selecting the access station which establishes the route with the terminal according to the channel quality information, the method further comprises the steps of the terminal initiating a service request to the selected access station; judging whether the access station is a base station or a relay station; if the access station is a base station, the terminal sending communication data to the base station; if the access station is a relay station, further judging whether a Local Forwarding mode is started, if it is judged that the Local Forwarding mode is started, adopting, in a condition that a current access station of the terminal and a current access station of a terminal communicating with the terminal are the same relay station, the Local Forwarding mode to perform communication, it is judged that the Local Forwarding mode is not started, the terminal sending communication data to the base station.

Preferably, when the terminal performs a secondary route selection, initiates a handover with no service or initiates a network re-entry with no service, the step of selecting the access station which establishes a route with the terminal according to the channel quality information comprises a step of: selecting an access station corresponding to a maximum SINR determined according to the channel quality information as the access station which establishes the route with the terminal.

Preferably, when the terminal initiates a service, initiates a handover with a service or initiates a network re-entry with a service, the step of selecting the access station which establishes the route with the terminal according to the channel quality information further comprises a step of: selecting the access station which establishes the route with the terminal according to the SINR and a service rate.

Preferably, the step of selecting the access station which establishes the route with the terminal according to the SINR and the service rate comprises the steps of: determining, according to the SINR and the service rate, a first selection threshold through the following formula: $C(m,n)=C(m)+C(n)$, wherein $$C(m) = \min_{0 \leq l_m \leq n_p - 1} \{C_{l_m}(m)\}, C(n) = \min_{0 \leq l_n \leq n_p - 1} \{C_{l_n}(n)\},$$

$$C_l(u) = \sum_{i=1}^{h_l} \left\lceil \frac{R(u)}{\eta(SINR_l^i(u))} \right\rceil,$$

wherein m and n respectively represent different terminals, $\lceil \square \rceil$ represents taking a minimum integer greater than the expression, $$\left\lceil \frac{R(u)}{\eta(SINR_l^i(u))} \right\rceil$$

represents the number of slots needed to be allocated when the terminal u transmits data on the $i^{th}$ hop of link of a path $P_l(u)$ with the service rate of R(u); determining, according to the SINR and the service rate, a second selection threshold through the following formula:

$$C'(m, n) = \min_{1 \leq l \leq n_p - 1} \{C'_l(m, n)\},$$

wherein $$C'_l(m, n) = \left\lceil \frac{R(m)}{\eta(SINR_l^{h_l}(m))} \right\rceil + \left\lceil \frac{R(n)}{\eta(SINR_l^{h_l}(n))} \right\rceil,$$

wherein $\lceil \square \rceil$ represents taking a minimum integer greater than the expression, $$\left\lceil \frac{R(u)}{\eta(SINR_l^i(u))} \right\rceil$$

represents the number of slots needed to be allocated when a terminal u transmits data on the $i^{th}$ hop of link of a path $P_l(u)$ with the service rate of R(u); comparing the first selection threshold with the second selection threshold; if the first selection threshold is greater than the second selection threshold, selecting a base station as the access station which establishes the route with the terminal; if the first selection threshold is less than or equal to the second selection threshold, selecting a relay station as the access station which establishes the route with the terminal.

Preferably, before the step of selecting the access station which establishes the route with the terminal according to the channel quality information, the method further comprises the steps of: judging whether a Local Forwarding mode is supported; if it is judged that the Local Forwarding mode is supported, further judging whether the Local Forwarding mode is started; if it is judged that the Local Forwarding mode is started, performing the step of selecting the access station which establishes the route with the terminal according to the channel quality information.

Preferably, the step of selecting the access station which establishes the route with the terminal according to the channel quality information comprises one of the following: the control station selecting, according to the channel quality information, the access station which establishes the route with the terminal; the terminal selecting, according to the channel quality information, the access station which establishes the route with the terminal, and reporting a selection result to the control station.

Preferably, the control station comprises one of the following network elements: a macro base station, a micro base station, a pico base station and a relay station.

In view of the above, according to another aspect of the present invention, an apparatus for establishing a service route is provided.

The apparatus for establishing a service route according to the present invention comprises: a collection module, configured to collect channel quality information of all links on each path of a terminal; and a selection module, configured to select, according to the channel quality information, an access station which establishes a route with the terminal.

By virtue of the present invention, when the terminal performs a secondary route selection or initiates a handover, a control station collects channel quality information of all links on each path of a terminal, and an access station which establishes a route with the terminal is selected according to the channel quality information, thus the problem that an access station which establishes a route with the terminal can not be selected according to the actual application situation is solved, the selection of an access station which establishes a route with the terminal according to the actual application situation is realized.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

A detailed description is given to the preferred embodiments of the invention with reference to the accompanying drawings. The preferred embodiments of the present invention are described for the purpose of illustration, not for limiting the present invention.

Method Embodiment

Figure 1:
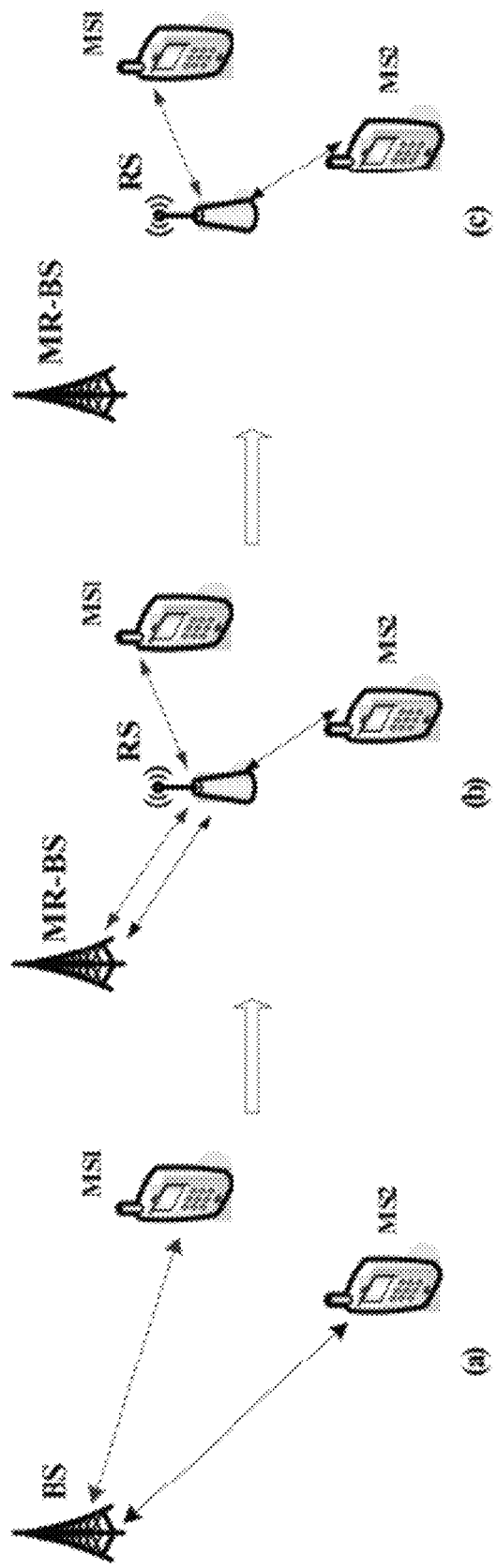
FIG. 1 shows schematic diagrams of a conventional data sending mode and a Local Forwarding mode in a multi-hop system according to relevant art.
Figure 2:
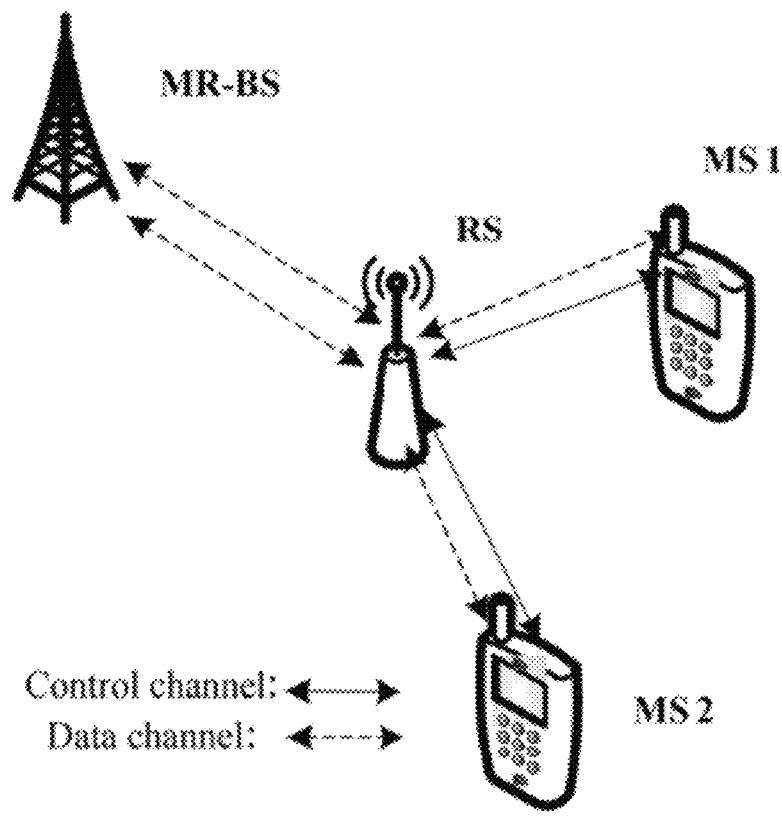
FIG. 2 shows a schematic diagram for illustrating a control channel and a data channel in a Local Forwarding mode according to relevant art.
Figure 3:
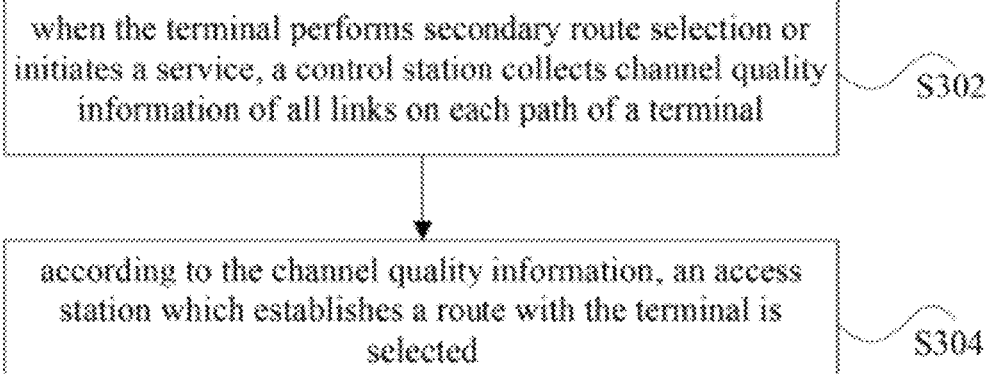
FIG. 3 shows a flowchart of a method for establishing a service route according to an embodiment of the present invention.

According to an embodiment of the present invention, a method for establishing a service route is provided. FIG. 3 shows a flowchart of a method for establishing a service route according to the embodiment of the present invention. As shown in FIG. 3, the method comprises the following steps S302 to S304.

S302: a control station collects channel quality information of all links on each path of a terminal, wherein the control station can comprise one of the following network elements: a macro BS, a micro BS, a pico BS and an RS.

S304: according to the channel quality information, an access station which establishes a route with the terminal is selected. Specifically, the control station can select an access station which establishes a route with the terminal according to the channel quality information; or the terminal selects an access station which establishes a route with the terminal according to the channel quality information and reports a selection result to the control station.

Preferably, the step of the control station collecting the channel quality information occurs when the terminal performs a secondary route selection, initiates a service, initiates a handover, or initiates a network re-entry, in which, the process of the terminal performing the secondary route selection comprises: during an initial network entry, according to an instruction of the control station, the terminal accessing another control station. The channel quality information collected by the control station comprises SINR.

For different scenarios, the method can be implemented by the following three modes respectively.

Mode 1

This mode is a route selection algorithm based on the SINR and is executed only when the user performs a secondary route selection and a handover. The user uses the same route selection algorithm when performing the secondary route selection and the handover, that is, the user uses the same rule to select a station that the user is to access or a station that the user is to re-access due to the handover.

When the user performs a secondary route selection or initiates a handover, an MR-BS collects the channel quality information of all links on each optional path of an MS, that is, the SINR of each link. According to the SINR value of each link, through the calculation of the route selection algorithm, a proper station is selected for access. Once the user selects an access station, the user does not consider changing the access station when initiating a service, only changing the access station during the handover.

Specifically, when the terminal performs a secondary route selection or initiates a handover, the step of selecting an access station which establishes a route with the terminal according to the channel quality information comprises the steps of: according to the SINR, a slot utilization efficiency is determined through the following formula:

$$\eta(SINR) = \frac{48 \times m \times r}{T_{frame}} (Kbps/Slot),$$

that is, the formula (1) described in the Background, wherein η(SINR) is the slot utilization efficiency, m is a modulation parameter, r is a coding rate, and $T_{frame}$ is a frame length.

Then, the access station corresponding to the maximum slot utilization efficiency determined according to the channel quality information is selected as the access station which establishes a route with the terminal.

Figure 4:
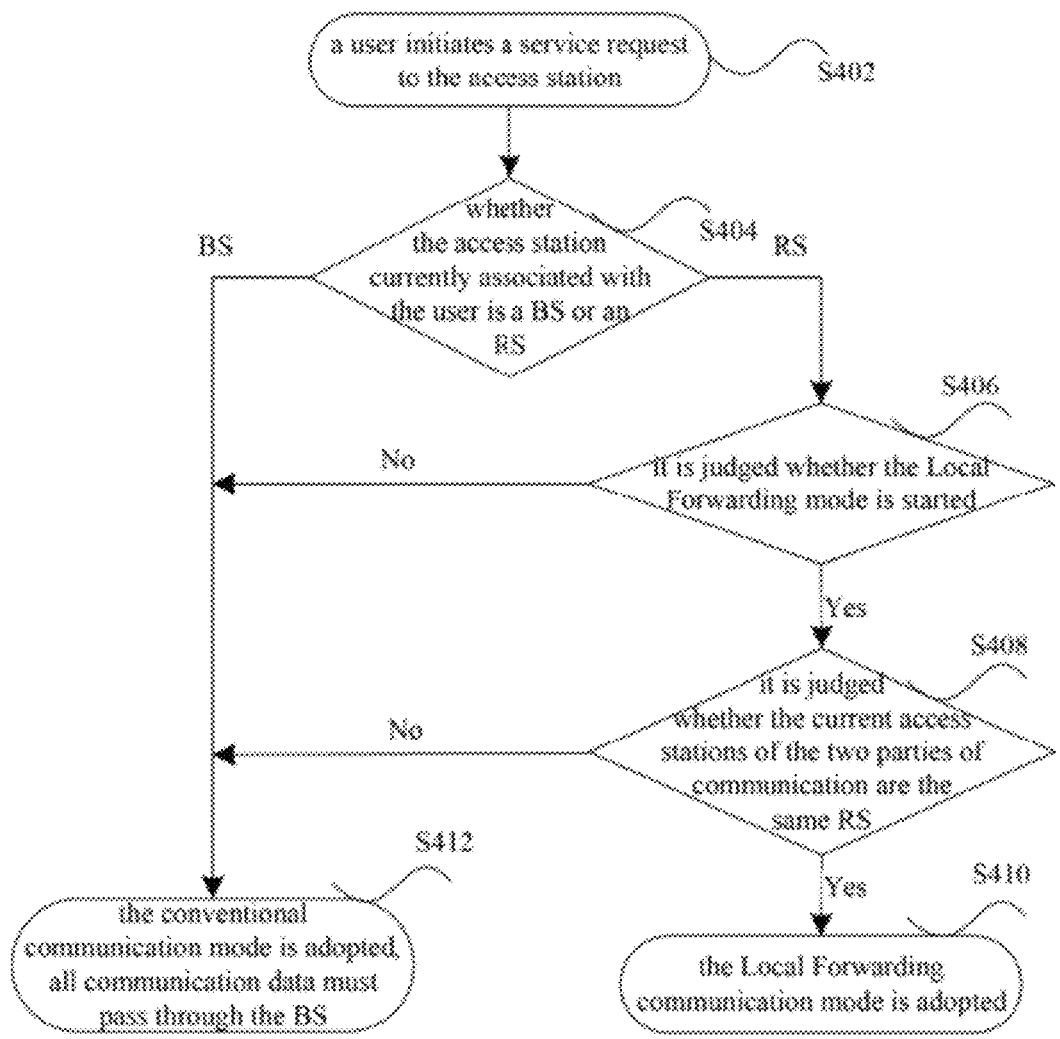
FIG. 4 shows a flowchart of Mode 1 of a method for establishing a service route according to an embodiment of the present invention.

Since this mode is performed only when performing a secondary route selection and a handover, the user has selected an associated station when initiating a service, whether the user adopts the Local Forwarding mode to perform data communication when initiating the service is only dependent on whether the user pair performing communication currently is associated with the same RS, wherein the process is as shown in FIG. 4.

FIG. 4 shows a flowchart of Mode I of a method for establishing a service route according to the embodiment of the present invention. As shown in FIG. 4, after the step of selecting an access station which establishes a route with the terminal according to the channel quality information, the method further comprises the following steps S402 to S412.

S402: the terminal initiates a service request to the selected access station.

S404: it is judged whether the access station currently associated with the user is a BS or an RS, if the access station is an RS, go to S406; if the access station is a BS, go to S412.

S406: it is judged whether the Local Forwarding mode is started, if yes, go to S408; otherwise, go to S412.

S408: it is judged whether the two parties of communication (the current access stations of the terminal and a terminal communicating with the terminal) are the same RS, if yes, go to S410; otherwise, go to S412.

S410: the Local Forwarding mode is adopted to perform communication.

S412: if the access station is a BS, the conventional communication mode is adopted, all communication data must pass through the BS, and the terminal sends communication data to the BS.

Considering the compatibility of the system, before the user accessing the RS judges whether to perform communication by adopting the Local Forwarding mode, it is necessary to verify whether the capabilities of the user terminal and the access terminal support the Local Forwarding mode, if the Local Forwarding mode is not supported, communication is performed according to the conventional mode. Besides, on the terminal supporting the Local Forwarding mode, the Local Forwarding mode also can be set, and this mode can be closed when necessary.

When the user performs a secondary route selection and a handover, the network can only obtain two kinds of useful information for path selection: (1) the link quality information on each optional path of the current MS, that is, SINR; (2) the load condition of each station of the current network. However, since there might be no service occurring when the user performs a secondary route selection and a handover, the secondary route selection or the handover of the user probably is only to associate with a certain station, causing no impact on the load of the station, thus the station load information that can be obtained is not taken into account during the route selection process, then the channel quality information of each path becomes the only available condition. This mode only needs the SINR information of the link and thus is simpler.

The following two modes are service based route selection modes. In Mode 1, since path selection is performed only when performing a secondary route selection and a handover, the system can not take the service requirement of the user into account. When the user really initiates a service, there exist some drawbacks in Mode 1 as follows.

(1) If the Local Forwarding mode is adopted, the data link of the user uses one less hop of resources, thus the cost paid when the user accesses the RS is less the cost paid in the original two hops, at this moment, the cost function of route selection should be changed.

(2) The path cost function in the route selection algorithm in Mode 1 represents the slot cost that a unit bit needs to pay, and this is an ideal calculation method. However, in an actual system, the allocation of the slot resources must be an integer multiple, if the data packet to be transmitted can not occupy the whole slot, the slot needs to be filled. Thus, the bigger the data packet is, the higher the accuracy of the algorithm in Mode 1 is; otherwise, for the small data service such as voice, the algorithm is less accurate.

(3) For the handover, if the user has a service at this moment, the factor of the service can be taken into account, then the algorithm in Mode 1 also can be improved.

Figure 5:
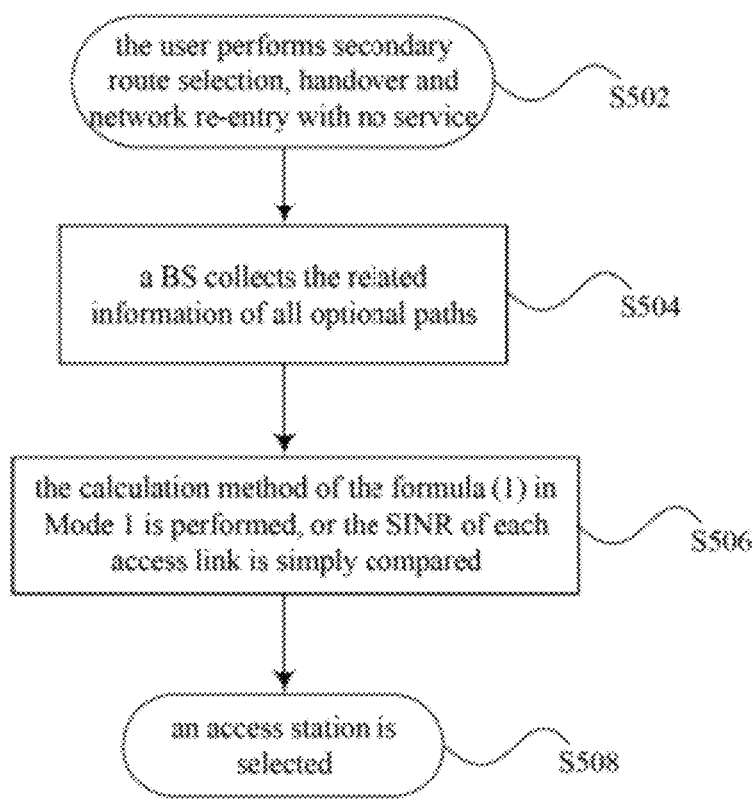
FIG. 5 shows a flowchart of Mode 2 of a method for establishing a service route according to an embodiment of the present invention.
Figure 6:
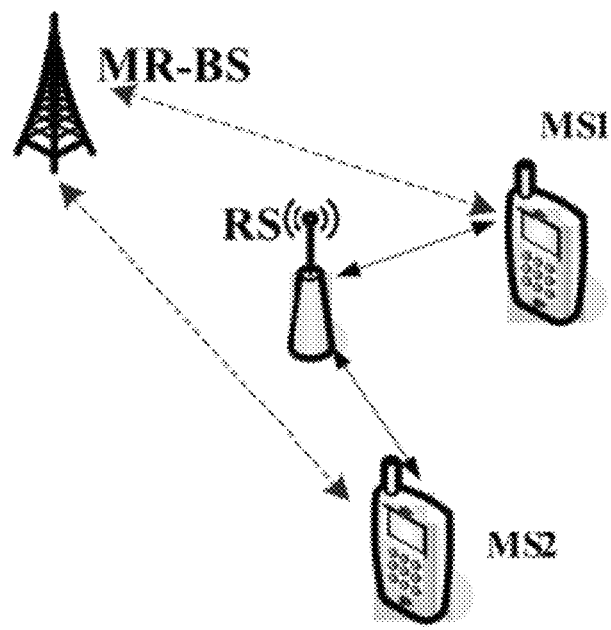
FIG. 6 shows a schematic diagram for illustrating route selection when a large number of users in the Local Forwarding mode exist according an the embodiment of the present invention.

The service based route selection mode is illustrated below in detail, and the execution process is as shown in FIG. 5 and FIG. 6. Based on whether there is a service occurring during route selection, the scenarios are divided into two main parts as follows, Mode 2: the secondary route selection of the user, the handover with no service and the network re-entry with no service; Mode 3: the user initiates a service, the handover and the network re-entry with a service. These two modes adopt different route selection modes respectively.

Mode 2

The application scenario of this mode is: the secondary route selection of the user, the handover with no service or the network re-entry with no service.

FIG. 5 shows a flowchart of Mode 2 of a method for establishing a service route according to the embodiment of the present invention. As shown in FIG. 5, the method comprises the following steps S502 to S508.

S502: the user performs a secondary route selection, a handover with no service, or a network re-entry with no service.

S504: a BS collects the related information of all optional paths.

S506: the calculation method of the formula (1) in Mode 1 is performed, and the access station corresponding to the maximum slot utilization efficiency determined according to the channel quality information is selected as the access station which establishes a route with the terminal; or the SINRs of respective access links are simply compared.

Specifically, at this moment, the user has no service occurring, the only useful condition for route selection is the SINR of each link. At this moment, the route selection mode can have two options:

Option 1: an access station is selected according to the method in Mode 1; this option is suitable for the scenario with a low proportion of users in Local Forwarding mode.

Option 2: the station with large access link (access BS or RS) SINR value is selected as the access station, that is, when the terminal performs a secondary route selection, initiates a handover with no service or initiates a network re-entry with no service, the access station corresponding to the maximum SINR determined according to the channel quality information is selected as the access station which establishes a route with the terminal; this option is suitable for the scenario with a big proportion of users in Local Forwarding mode.

S508: the access station is selected.

FIG. 6 shows a diagram for illustrating route selection when a large number of users in the Local Forwarding mode exist according to the embodiment of the present invention. As shown in FIG. 6, as long as the SINR of the link RS<->MS1 and the SINR of the link RS<->MS2 are respectively greater than the SINR of the link MR-BS<->MS1 and the SINR of the link MR-BS<->MS2, the system would get a gain when adopting the Local Forwarding mode. When the proportion of users in the Local Forwarding mode is relatively large, this algorithm can avoid many route re-selection operations.

Mode 3

The application scenario of this mode is: the user initiates a service, a handover and a network re-entry with a service.

For a user already entering a network, the user has been associated with a certain access station. When a service is initiated or a call is received, this action is considered as a trigger condition of the mule selection, the access station is switched again and a more proper path is selected to perform data communication.

Figure 7:
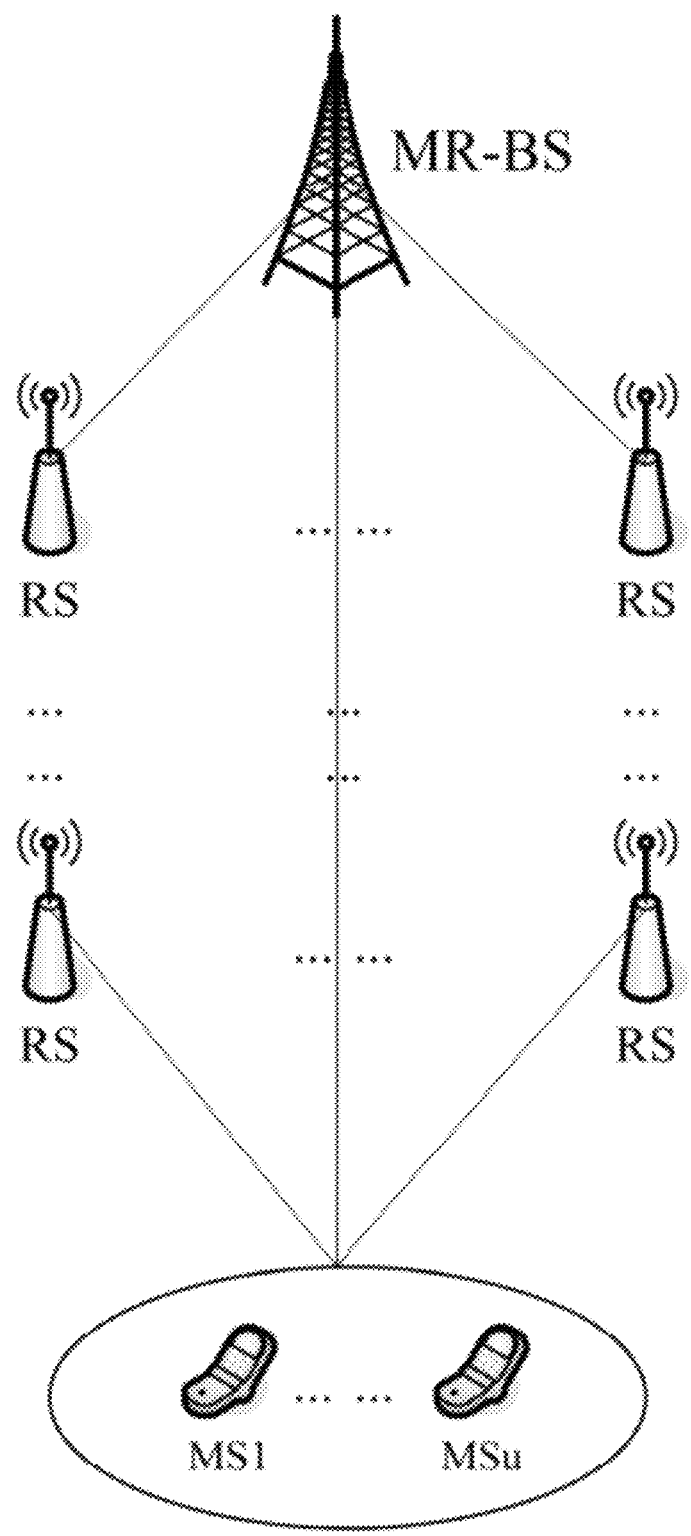
FIG. 7 shows a schematic diagram of a logic link and a network structure of Mode 3 for establishing a service route according to an embodiment of the present invention.

FIG. 7 shows a diagram of a logic link and a network structure of Mode 3 for establishing a service route according to the embodiment of the present invention. As shown in FIG. 7, in order not to lose generality, the network structure is abstracted into a logic connection diagram, which comprises three parts: one is the base station MR-BS, one is the user MS, and the rest one is the relay part. Theoretically, any user in the network can perform communication through the forwarding of some relays in the network or through directly connecting with the MR-BS. Particularly, for the hypothetical network structure, the relay part only consists of two RSs.

Provided for any user, there are $n_p$ optional paths between the user and the MR-BS totally. For a fixed network, $n_p$ is a limited fixed value, which depends on the number of the MR-BSs and the RSs deployed in a cell, that is, for all users, the number of the potential optional paths is the same.

Provided l is a logic index of each optional path, then l=0, 1, 2, ..., $n_p$−1. When l==0, it indicates that the user is directly connected with the MR-BS, without the forwarding of the RS. Provided the path index l is the same for any user if all higher-level access stations the user is to pass through on the path are the same; and $h_l$ is used to represent the total number of hops of the path l.

In order to distinguish the paths of different users, $P_l(u)$ is used to represent each optional path between the user u and the MR-BS. However, as long as the logic indexes l of the paths are the same, then all access stations on respective optional paths of the user are the same (except the user itself). $P_l^i(u)$ represents the $i^{th}$ hop of link on the path $P_l(u)$, wherein i=1, 2, ... $h_l$. $SINR_l^i(u)$ is used to represent the SINR on the link $P_l^i(u)$, then $\eta(SINR_l^i(u))$ is the slot efficiency of the link $P_l^i(u)$.

When the Local Forwarding mode is introduced to perform data transmission, the communication data are not necessary to be transmitted to the MR-BS, then except the direct link, the other $n_p-1$ paths all can be simplified as the link in the Local Forwarding mode, that is, the user has $n_p-1$ extra optional paths. Provided $P'_l(u)$ is used to represent the Local Forwarding path of the user u, then $P'_l(u)$ has only one hop, and $P'_l(u)=P_l^{h_l}(u)$, l=1, 2, ..., $n_p-1$.

Figure 8:
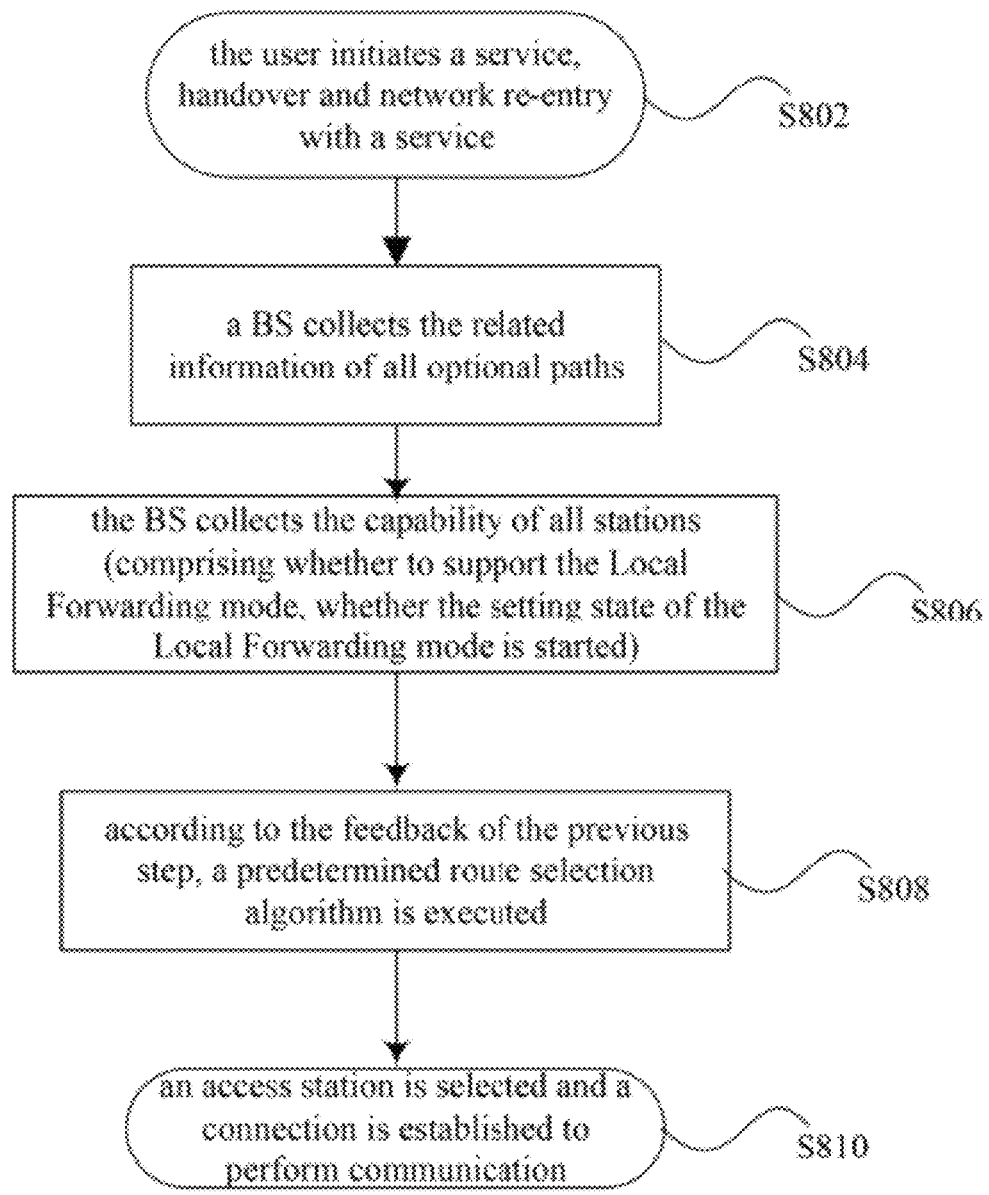
FIG. 8 shows a flowchart of Mode 3 of a method for establishing a service route according to an embodiment of the present invention.

FIG. 8 shows a flowchart of Mode 3 of a method for establishing a service route according to the embodiment of the present invention. As shown in FIG. 8, the method comprises the following steps S802 to S810.

S802: the user initiates a service, a handover or a network re-entry with a service.

S804: a BS collects the related information of all optional paths.

S806: the BS collects the capability of all stations (comprising whether the Local Forwarding mode is supported, whether the setting state of the Local Forwarding mode is 'started').

Specifically, it is judged whether the Local Forwarding mode is supported, if the Local Forwarding mode is supported, it is further judged whether the Local Forwarding mode is started, if the Local Forwarding mode is started, the operation of selecting an access station which establishes a route with the terminal according to the channel quality information is performed.

S808: according to the feedback of the previous step, a predetermined route selection algorithm is executed.

Specifically, when the terminal initiates a service, initiates a handover with a service or initiates a network re-entry with a service, the step of selecting an access station which establishes a route with the terminal according to the channel quality information comprises a step of: the access station which establishes a route with the terminal is selected according to the SINR and the service rate, wherein the process comprises steps as follows.

Provided that the service rate required by the user u is R(u), then the cost needed when selecting the path $P_l(u)$ to perform communication is defined as follows:

$$C_l(u) = \sum_{i=1}^{h_l} \left\lceil \frac{R(u)}{\eta(SINR_l^i(u))} \right\rceil \quad (5)$$

wherein $\lceil \square \rceil$ represents taking a minimum integer greater than the expression, $$\left\lceil \frac{R(u)}{\eta(SINR_l^i(u))} \right\rceil$$

represents the number of slots needed to be allocated when the user u transmits data on the $i^{th}$ hop of link of the path $P_l(u)$ with the service rate of R(u). Since slot is the smallest resource allocation unit, the number of allocated slots needs to take an integer.

When Local Forwarding is not adopted, for the intercommunicated user pair m,n, they can only select a route separately, and the route selection targets selected separately are respectively as follows:

$$C(m) = \min_{0 \le l_m \le n_p - 1} \{C_{l_m}(m)\} \quad (6)$$

$$C(n) = \min_{0 \le l_n \le n_p - 1} \{C_{l_n}(n)\} \quad (7)$$

If the user terminal or the access terminal does not support Local Forwarding, or the terminal closes the Local Forwarding mode, the algorithm stops here, and a path with smallest cost is selected according to formulae (6) and (7) to perform communication.

If Local Forwarding mode is allowed, then the total route selection cost (i.e. the first selection threshold) paid when the user pair m,n selects route according to formulae (6) and (7) independently to accomplish the communication is:

$$C(m,n)=C(m)+C(n) \quad (8)$$

When Local Forwarding mode is taken into account, the intercommunicated user pair m,n can perform associated route selection. When the user pair m,n selects path $P'_l(m)$ and path $P'_l(n)$ respectively to perform communication, that is, when the user pair selects to access the same RS and perform the data communication of Local Forwarding, the cost paid is defined as follows:

$$C'_l(m, n) = \left\lceil \frac{R(m)}{\eta(SINR_l^{h_l}(m))} \right\rceil + \left\lceil \frac{R(n)}{\eta(SINR_l^{h_l}(n))} \right\rceil \quad (9)$$

wherein l≠0.

The associated route selection target (i.e. the second selection threshold) of the user pair m,n is:

$$C'(m, n) = \min_{1 \le l \le n_p - 1} \{C'_l(m, n)\} \quad (10)$$

If C'(m,n)<C(m,n), the Local Forwarding mode is adopted and the corresponding path is selected; otherwise, the user pair m,n selects route separately according to formulae (6) and (7). That is to say, the first selection threshold is compared with the second selection threshold, if the first selection threshold is greater than the second selection threshold, the BS is selected as the access station which establishes a route with the terminal; if the first selection threshold is less than or equal to the second selection threshold, the relay is selected as the access station which establishes a route with the terminal.

S810: an access station is selected, and a connection is established to perform communication.

In the embodiment of the present invention, a data transmission method for a relay communication system is provided, wherein the relay communication system can comprise one or more RSs, one or more transmitting terminals, and one or more receiving terminals.

Hereinafter, the embodiments of the present invention are illustrated in detail by taking the World Interoperability for Microwave Access (WiMAX) for example.

The WiMAX is a Broadband Wireless Access Metropolitan Area Network based on IEEE802.16 standard. The basic object of the WiMAX is to guarantee the interconnection and intercommunication of wireless apparatuses of different factories in the environment of metropolitan area network. The WiMAX is mainly used to provide "The Last Mile" high-speed broadband access for family, enterprise and mobile communication networks and to apply to the future personal mobile communication service. The IEEE802.16 standard establishes the criteria of Physical Layer (PHY) and Media Access Control (MAC), which is a new air interface standard provided for microwave frequency band. The IEEE802.16m comprising a relay structure is the latest standard technology at present.

Embodiment 1

Figure 9:
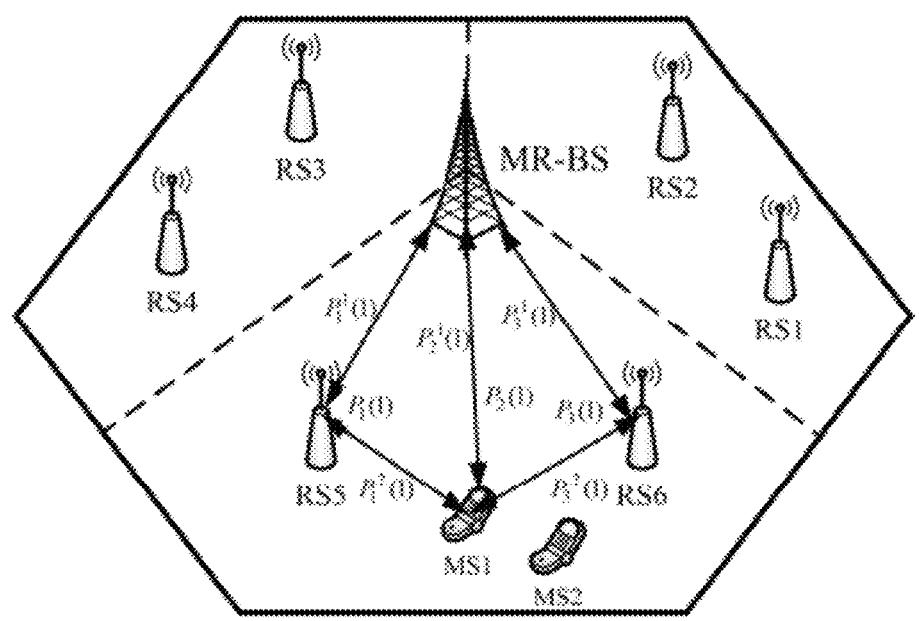
FIG. 9 shows a schematic diagram of a topological structure according to Embodiment 1 and Embodiment 2 of the present invention.

FIG. 9 shows a schematic diagram of a topological structure according to Embodiment 1 and Embodiment 2 of the present invention. As shown in FIG. 9, for the user 1, there are totally $n_p(1)=3$ paths between the user 1 and the MR-BS, wherein the paths are expressed as $P_1(1)$, $P_2(1)$ and $P_3(1)$ respectively. For the optional path $P_1(1)$ of the user 1, there are totally $h_l(1)=2$ hops, wherein the first hop of link MR-BS<->RS5 is expressed as $P_1^1(1)$, and the second hop of link RS5<->MS1 is expressed as $P_1^2(1)$.

We define the cost paid when the user u selects the path $P_l(u)$ to perform communication as follows:

$$C_l(u) = \sum_{i=1}^{h_l(u)} \frac{1}{\eta(SINR_l^i(u))} \quad (3)$$

For the user u, the route selection target is:

$$\min_{1 \le l \le n_p(u)} \{C_l(u)\} \quad (4)$$

In formula (3), for the $P_l(u)^{th}$ optional path of the user u, there are totally $h_l(u)$ hops, then $$\frac{1}{\eta(SINR_l^i(u))}$$

represents the slot cost needed to be paid when a unit bit is transmitted by the $i^{th}$ hop of link on the path $P_l(u)$, and the sum of the slot costs needed to be paid by all $h_l(u)$ hops of links is the cost needed to be paid when this path is selected. Then the path with the smallest route selection cost obtained through the formula (4) is the path which is selected, and the access station on this path is the access station selected by the user u, at this moment, the user can use the minimum slot resources to transmit the same data.

Formulae (3) and (4) are illustrated in detail by taking FIG. 9 for example.

MS1 has three paths to access the MR-BS, respectively being:

MS1<->RS5<->MR-BS, which is marked as path 1;
MS1<->MR-BS, which is marked as path 2; and
MS1<->RS6<->MR-BS, which is marked as path 3.

The implication of (3) is as follows.

For the path 1, the link efficiency of the link MS1-RS5 and the link efficiency of the link RS5<->MR-BS on the path 1 are calculated respectively and the reciprocal of the link efficiency is taken as the cost of this link, then the cost of selecting the path 1 is the sum of the cost of the link MS1<->RS5 and the cost of the link RS5<->MR-BS.

For the path 2, the path has only one hop of link MS1<->MR-BS, the link efficiency of the link MS1<->MR-BS is calculated and the reciprocal of the link efficiency is taken as the cost of this link, then the cost of selecting the path 2 is the cost of the link MS1<->MR-BS.

For the path 3, the link efficiency of the link MS1<->RS6 and the link efficiency of the link RS6<->MR-BS are calculated respectively and the reciprocal of the link efficiency is taken as the cost of this link, then the cost of selecting the path 3 is the sum of the cost of the link MS1<->RS6 and the cost of the link RS6<->MR-BS.

The implication of (4) is as follows.

The path with the smallest cost in the paths 1, 2 and 3 is selected as the optimal access path of the user MS1.

When the access station on the optimal path selected by the user is fully loaded, the user needs to select a secondary optimal path to have an access, and search in turn a proper station to have an access.

When the system is a network with more than two hops, the route selection algorithm of the MS is applicable to the route selection of the RS too.

Embodiment 2

Formulae (5) to (10) are illustrated in detail by taking FIG. 9 for example too.

The implications of the formula (5) and the formula (3) are basically the same, only the calculation of the link cost has a slight difference: the reciprocal of the link efficiency is not taken as the link cost, instead, the link cost is obtained by dividing the service rate by the link efficiency.

The implications of the formula (6) and the formula (7) are the same as that of the formula (4); the optimal paths of the MS1 and the MS2 are selected respectively to access the system.

If the users MS1 and MS2 are a communication user pair, the route selection process is not ended, and formula (8) is used to calculate the sum of the route selection costs of the users MS1 and MS2.

If Local Forwarding is taken into account, the communication paths of the users MS1 and MS2 have two extra ones, which respectively are:

MS1<-22 RS5<->MS2, which is marked as path 1; and
MS1<->RS6<->MS2, which is marked as path 2.

The implication of the formula (9) is as follows.

For the path 1, the link cost of the link MS1<->RS5 and the link RS5<->MS2 is calculated respectively, and the sum of the two link costs is taken as the route selection cost of the users MS1 and MS2, that is, the cost of selecting the Local Forwarding mode to perform communication.

For the path 2, the link cost of the link MS1<->RS6 and the link RS6<->MS2 is calculated respectively, and the sum of the two link costs is taken as the route selection cost of the users MS1 and MS2, that is, the cost of selecting the Local Forwarding mode to perform communication.

The implication of the formula (10) is as follows.

It is judged which cost is smaller when selecting to access the RS5 or the RS6 to perform the Local Forwarding communication.

Finally, the total cost of the separate route selection of the users MS1 and MS2 is compared with the total cost of performing the Local Forwarding, and the path with smaller cost is selected as the optimal access path.

Embodiments 3 to 6 to be described hereinafter are the simulation examples with simulation platform established according to the attached system and parameters. The simulation result respectively considers the service required by data rate 64 Kbps and data rate 384 Kbps, and the validity of Mode 1, the validity of Mode 2 and the validity of Mode 3 are compared.

The throughput performances of a single-hop cellular system and an MR cellular system are compared, and the performances of the MR cellular system and the Local Forwarding system are compared. The simulation platform above does not consider the special scenario of RS deployment but considers the generality of RS deployment, thus in the simulation the users comply with a uniform distribution and do not have a great density in the vicinity of the RS in a cell. If the special scenario of relay application is considered, the proportion of the relay users in the total users will be greater, thus the following relay and shortcut technology will contribute a greater improvement to the enhancement of the system performance.

Embodiment 3 and Embodiment 4

Table 1 shows the comparative data of the throughput of the single-hop cellular system and the multi-hop cellular system obtained after simulation by using Mode 1. One scenario is Embodiment 3: all users adopt the data service with rate of 64 Kbps; and the other scenario is Embodiment 4: all users adopt the data service with rate of 384 Kbps. From Table 1, it can be concluded that Mode 1 greatly improves the capacity of the system.

TABLE 1

Throughput comparison per sector in Mode 1
(Embodiment 3, Embodiment 4)

| System Traffic | BS Only (Mbps/Sector) | With RS (Mbps/Sector) | Throughput Improvement (%) |
|---|---|---|---|
| t(Mbps/Sector) (Traffic: 64 Kbps) | 1.7339 | 2.4488 | 41.23% |
| (Mbps/Sector) (Traffic: 384 Kbps) | 1.7647 | 2.5827 | 46.35% |

TABLE 2

Throughput comparison per sector of Embodiment 3 and Embodiment 4 after adopting Local Forwarding in Mode 1

| MMR Shortcut Probability | Without Local Forwarding Throughput (Mbps/sector) (Traffic: 384 Kbps) | With Local Forwarding Throughput (Mbps/sector) (Traffic: 384 Kbps) | Improvement |
|---|---|---|---|
| 20% | 2.5827 | 2.7048 | 4.73% |
| 40% | | 2.7949 | 8.22% |
| 60% | | 2.9832 | 15.51% |
| 80% | | 3.0764 | 19.12% |

Table 2 shows the system performance comparison made after introducing Local Forwarding into Embodiment 3 and Embodiment 4 in Mode 1. It can be concluded that, by taking the data service of 384K for example, the system throughput performance is increased by 4.73%, 8.22%, 15.51% and 19.12% respectively when the proportion of the intercommunicated users in the same RS is 20%, 40%, 60% and 80% of the total number of users respectively. Therefore, it can be concluded that Local Forwarding has an obvious effect in the improvement of the system capacity, and the simple route selection mode like Mode 1 is effective for both the relay system and the Local Forwarding system.

Embodiment 5 and Embodiment 6

Table 3 shows the comparative data of the throughput of the single-hop cellular system and the multi-hop cellular system obtained after simulation according to Mode 2 and Mode 3. It can be concluded that the network can select a route more reasonably since the factor of service is introduced to the route selection algorithm. By comparing Table 1 and Table 3, it can be concluded that no matter it is the service of 64 Kbps (Embodiment 5) or the service of 384 Kbps (Embodiment 6), Mode 2 and Mode 3 are superior to Mode 1.

TABLE 3

Throughput comparison per sector in Mode 2 and Mode 3
(Embodiment 5, Embodiment 6)

| System Traffic | BS Only | With RS | Throughput Improvement (%) |
|---|---|---|---|
| (Mbps/Sector) (Traffic: 64 Kbps) | 1.7339 | 2.4832 | 43.21% |
| (Mbps/Sector) (Traffic: 384 Kbps) | 1.7647 | 2.6285 | 50% |

TABLE 4

Throughput comparison per sector of Embodiment 5 and Embodiment 6 after adopting Local Forwarding in Mode 2 and Mode 3

| MMR Shortcut Probability | Without Local Forwarding Throughput (Mbps/sector) (Traffic: 384 Kbps) | With Local Forwarding Throughput (Mbps/sector) (Traffic: 384 Kbps) | Improvement |
|---|---|---|---|
| 20% | 2.6285 | 2.8212 | 7.33% |
| 40% | | 2.9779 | 13.29% |
| 60% | | 3.0551 | 16.23% |
| 80% | | 3.1945 | 21.53% |

Table 4 shows the system performance comparison made after introducing the Local Forwarding mode into the system in Mode 2 and Mode 3. It can be concluded that, by taking the data service of 384K (Embodiment 6) for example, the system throughput performance is increased by 7.33%, 13.29%, 16.23% and 21.53% respectively when the proportion of the intercommunicated users in the same RS is 20%, 40%, 60% and 80% of the total number of users respectively.

It should be noted that the simulation parameters of Embodiments 3 to Embodiment 6 are set as follows.

1. Assumption of System Model

TABLE 5

System-level simulation assumptions for the downlink

| Topic | Description | Baseline Simulation Assumptions |
|---|---|---|
| Basic modulation | Modulation schemes for data and control | QPSK, 16QAM, 64QAM |
| Duplexing scheme | TDD, HD-FDD or FD-FDD | TDD |
| Subchannelization | Subcarrier permutation | PUSC |

TABLE 5-continued

System-level simulation assumptions for the downlink

| Topic | Description | Baseline Simulation Assumptions |
|---|---|---|
| Resource Allocation Granularity | Smallest unit of resource allocation | PUSC: Non-STC: 1 slot, STC: 2 slots (1 slot = 1 subchannel × 2 OFDMA symbols) |
| Downlink Pilot Structure | Pilot structure, density etc. | Specific to PUSC subchannelization scheme |
| Data Channel Coding | Channel coding schemes | Convolutional Turbo Coding (CTC) |
| Control Channel Coding | Channel coding schemes and block sizes | Convolutional Turbo Coding (CTC), Convolutional Coding (CC) for FCH only |
| Scheduling | Demonstrate performance/ fairness criteria in accordance to traffic mix | Round Robin for full butter data only, fixed control overhead of 6 symbols, 22 symbols for data |
| Link Adaptation | Modulation and Coding Schemes (MCS) | QPSK(1/12), QPSK(1/6), QPSK(1/3), QPSK(1/2), QPSK(2/3), 16QAM(1/2), 16QAM(2/3), 64QAM(2/3), 64QAM(5/6) |
| Power Control | Subcarrier power allocation | Equal power per subcarrier |
| Frequency Reuse | Frequency reuse pattern | 3 Sector with frequency reuse of 1* |

*All technical proposals shall use frequency reuse factor of 1.

2. Simulation Scenario

TABLE 6

System Test scenarios

| Scenario/Parameters | Baseline Configuration (TDD) |
|---|---|
| Site-to-Site Distance | 1.5 km |
| Carrier Frequency | 2.5 GHz |
| Operating Bandwidth | 10 MHz for TDD |
| BS Height | 32 m |
| BS Tx Power per sector | 46 dBm |
| MS Height | 1.5 m |
| Lognormal Shadowing Std. Dev. | 8 dB |
| Channel | ITU Ped B (3 km/hr) |

3. BS Basic Parameters
The setting of BS basic parameters is as shown in Table 7.

TABLE 7

BS equipment model

| Parameter | Description | Value |
|---|---|---|
| $P_{BS}$ | MAX transmit power per sector/carrier | 46 dBm @ 10 MHz bandwidth |
| $H_{BS}$ | Base station height | 32 m |
| $G_{BS}$ | Gain (boresight) | 17 dBi |
| S | Number of sectors | 3 |
| $\theta_{BS}$ | 3-dB beamwidth | S = 3: $\theta_{BS}$ = 70° |
| $G_{FB}$ | Front-to-back power ratio | 30 dB |
| $M_{TX}$ | Number of transmit antennas | 2 |
| $M_{RX}$ | Number of receive antennas | 2 |
| $HW_{BS}$* | Cable loss | 2 dB |

*Implementation loss must be justified and accounted for separately.

Figure 10:
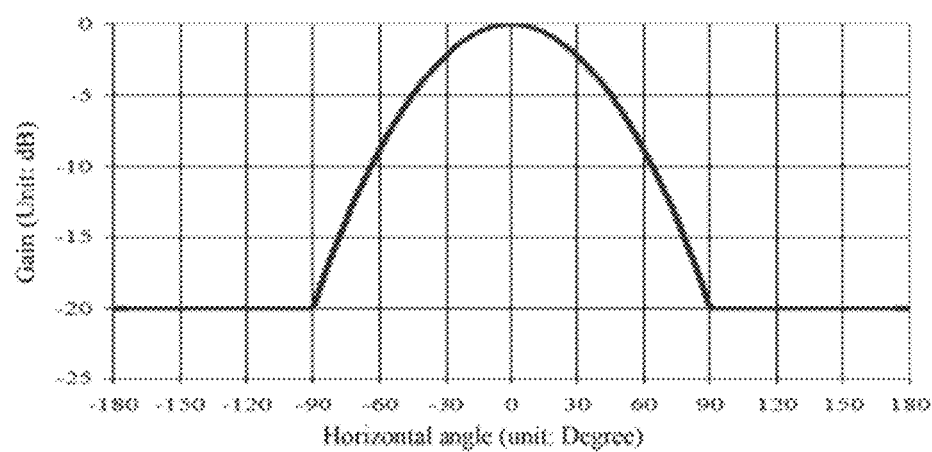
FIG. 10 shows a schematic diagram of the antenna orientation according to an embodiment of the present invention.

FIG. 10 shows a diagram of the antenna orientation according to the embodiment of the present invention (Antenna pattern for 3-sector cells). As shown in FIG. 10, the horizontal coordinate is Horizontal Angel, with a unit of Degree; and the longitudinal coordinate is Gain, with a unit of decibel (dB).

The BS antenna model of each sector is:

$$A(\theta) = -\min\left[12\left(\frac{\theta}{\theta_{3\,dB}}\right)^2, A_m\right] \quad (2\text{-}1)$$

wherein $A(\theta)$ is the antenna gain when the Horizontal Angel with respect to the antenna is $\theta$, with a unit of dBi, $-180° \leq \theta \leq 180°$, min [.] is the minimum value function, $\theta_{3\,dB}$ is the 3 dB beamwidth of antenna ($\theta_{3\,dB}=70°$), Am=30 dB is the front-to-back ratio of antenna. FIG. 9 shows the antenna simulation model used by each sector of a three-sector cell.

4. RS Basic Parameters are as Shown in Table 8:

TABLE 8

Basic Parameters for Test Scenarios with RS

| Scenario/parameters | ART RS scenario |
|---|---|
| Frequency Reuse | 1 × 3 × 1* |
| Number of RS per sector | 2** |
| BS Site-to-site distance | 1.5 km |
| RS placement distance (r) | 2 RSs per sector—3/8 of site-to-site distance |
| RS placement angle (φ) | 2 RSs per sector—26° |

*In a frequency reuse pattern of N × S × K, the network is divided into clusters of N cells (each cell in the cluster has a different frequency allocations), S sectors per cell, and K different frequency allocations per cell.
**Two RSs per sector are recommended here because the other parameters(e.g. RS placement distance, RS placement angle) are dependant on the number of RS.

TABLE 9

RS Equipment Model

| Parameter | Value ART RS scenario |
|---|---|
| Relay link | Relay link |
| RS Tx Power | 36 dBm per antenna |
| Relay station antenna height | 32 m |
| Number of transmit antennas | 1 |
| Number of receive antennas | 1 |
| Antenna type | Directional |
| Antenna gain (boresight) | 20 dBi |
| Antenna 3-dB beamwidth | 200 |
| Antenna front-to-back power ratio | 30 dB |
| Antenna orientation | Antenna array broadside pointed to BS direction |
| Noise figure | 5 dB |
| Cable loss | 2 dB |
| Access link | Access Link |
| RS Tx Power | 36 dBm per antenna |
| Relay station antenna height | 32 m |
| Number of transmit antennas | 2 |
| Number of receive antennas | 2 |
| Number of sectors | 1 |
| Antenna type | Omni in horizontal plane |
| Relay link | Relay Link |
| Antenna gain (boresight) | 7 dBi |
| Antenna 3-dB beamwidth | N/A |
| Antenna front-to-back power ratio | N/A |
| Antenna orientation | Antenna array broadside pointed to BS direction |
| Noise figure | 5 dB |
| Cable loss | 2 dB |

5. MS Basic Parameters

TABLE 10

MS Equipment Model

| Parameter | Description | Value |
|---|---|---|
| $P_{SS}$ | MS transmit power/per SS | 23 dBm |
| $H_{SS}$ | Subscriber station height | 1.5 m |
| $G_{SS}$ | Gain (boresight) | 0 dBi |
| $\{\theta_{SS}\}, G(\{\theta_{SS}\})$ | Gain as a function of Angle-of-arrival | Omni |
| $N_{TX}$ | Number of transmit antennas | 1 |
| $N_{RX}$ | Number of receive antennas | 2 |
| $NF_{SS}$ | Noise figure | 7 dB |
| $HW_{SS}$* | Cable Loss | 0 dB |

*Implementation loss must be justified and accounted for separately.

6. Path Loss Model

TABLE 11

Pathloss models for the ART Relay Scenario

| Link | Pathloss model |
|---|---|
| BS-MS and RS-MS | Recommendation ITU-R M.1225 |
| BS-RS | 802.16j EVM Type D |

The pathloss models of the links BS-MS and RS-MS are as follows:

$$PL(\text{dB})=40(1-4\times10^{-3}h_{BS})\log_{10}(R)-18\log_{10}(h_{BS})+21\log_{10}(f)+80 \quad (2\text{-}2)$$

wherein R is the distance between the transmit antenna and the receive antenna, with a unit of km; f is a carrier frequency, with a unit of MHz; $h_{BS}$ is the difference between the BS antenna height and the average roof top height of the located area, with a unit of m; in the simulation of the embodiment of the present invention, the average roof top height is assumed to be 25 m.

The pathloss model of the link BS-RS is as follows:

$$PL[\text{dB}] = \begin{cases} 20\log_{10}\left(\frac{4\pi d[m]}{\lambda[m]}\right) & \text{for } d \leq d'_0 \\ A + 10\gamma\log_{10}\left(\frac{d[m]}{d_0[m]}\right) + \Delta PL_f + \Delta PL_h & \text{for } d > d'_0 \end{cases} \quad (2\text{-}3)$$

wherein $A = 20\log_{10}\left(\frac{4\pi d'_0[m]}{\lambda}\right)$, $d_0 = 100m$, $d'_0 = d_0[m]10^{-\left(\frac{\Delta PL_f + \Delta PL_h}{10\gamma}\right)}$ $\gamma = a - hh_{BS}[m] + \frac{c}{h_{BS}[m]}$, $a = 3.6$, $b = 0.005$, $c = 20$, $\Delta PL_f = 6\log_{10}\left(\frac{f_c(\text{MHz})}{2000}\right)$, $\Delta PL_h = \begin{cases} -10\log_{10}\left(\frac{h_{RS}[m]}{3}\right) & \text{for } h_{RS} \leq 3m \\ -20\log_{10}\left(\frac{h_{RS}[m]}{3}\right) & \text{for } h_{RS} > 3m \end{cases}$, wherein λ represents the wave length of carrier, with a unit of m; d represents the distance between the transmit antenna and the receive antenna, with a unit of m; $h_{BS}$ represents the height of BS antenna, $h_{RS}$ represents the height of RS antenna, with a unit of m; and $f_c$ represents a carrier frequency, with a unit of MHz.

The application range of this model is from 100 m to 8 Km. In this simulation scenario, the distance between the MR-BS and the RS is $$\frac{3}{8} \times \text{site-to-site distance} = \frac{3}{8} \times 1500 = 562.5m,$$

which is entirely consistent with the usage range required by this model.

7. Adaptive Modulation and Coding (AMC)

The system adopts the AMC; the level of the AMC can be referred to section 2.3.2.1, totally with 9 levels of modulation and coding format. The modulation and coding format is dependent on the channel conditions, different levels of modulation and coding correspond to different SINR requirements, wherein the specific SINR requirement corresponding to each MCS is as shown in Table 12.

TABLE 12

The mode of adaptive modulation and coding

| MCS ID | MCS | SINR (dB) (PED-B: 3 km/h) |
|---|---|---|
| 1 | QPSK (1/12) | -3.14 |
| 2 | QPSK (1/6) | -0.73 |
| 3 | QPSK (1/3) | 2.09 |
| 4 | QPSK (1/2) | 4.75 |
| 5 | QPSK (2/3) | 7.86 |
| 6 | 16QAM (1/2) | 9.94 |
| 7 | 16QAM (2/3) | 13.45 |
| 8 | 64QAM (2/3) | 18.6 |
| 9 | 64QAM (5/6) | 24.58 |

The SINR of a channel can be expressed as follows:

$$\text{SINR(dB)}=P_T+G_T-\text{PathLoss}-\text{ShadowFading}-IR+G_R \quad (2\text{-}4)$$

wherein the parameters on the right part of the formula respectively are: channel transmit power, transmit antenna gain, pathloss, shadow fading, sum of noise power and total interference power inside a cell and between cells, receive antenna gain, all of which have a unit of dB.

The noise power of the receiving end user generally can be calculated through the following formula:

$$P_N(\text{dB})=-174+NF+10\log_{10}\text{Bandwidth(Hz)}-30 \quad (2\text{-}5)$$

wherein for the NF value of the RS and the MS, refer to the Noise Figure values in section 2.3.2.3 and section 2.3.2.4.

8. Frame Structure and OFDMA Parameters

8:1. Frame Structure

Figure 11:
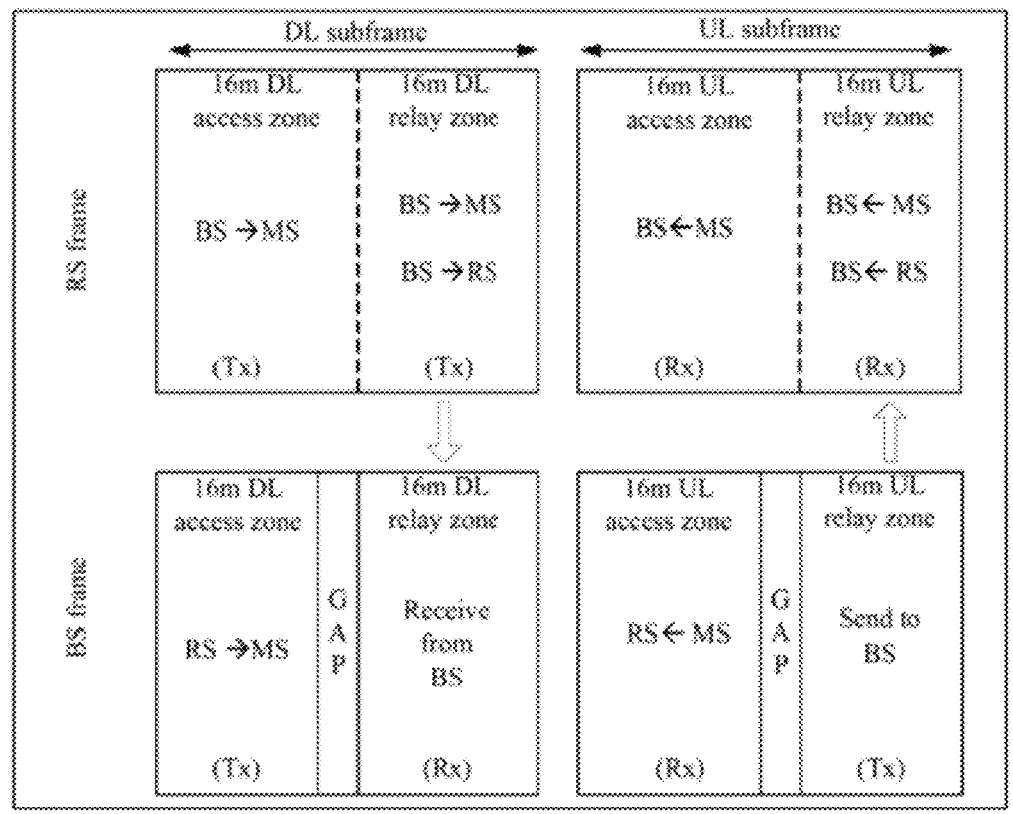
FIG. 11 shows a schematic diagram of a frame structure according to an embodiment of the present invention.

The network equipment can not receive data and transmit data simultaneously in a TDD mode, that is to say, the uplink and the downlink must be arranged into different slots. FIG. 11 shows a schematic diagram of a frame structure according to the embodiment of the present invention. A schematic diagram of a frame structure in proposal 802.16m is shown in FIG. 11, in this embodiment, the frame structure which is able to support multiple hops in the proposal is simplified into a frame structure applicable to two-hop link. Based on time, one frame is divided into two parts, i.e. an uplink subframe and a downlink subframe, and the uplink subframe and the downlink subframe are further divided into two parts, i.e. an Access Zone and a Relay Zone respectively. In a DL Access Zone, BS Frame/RS Frame sends data to the MS; in a DL Relay Zone, BS Frame sends data to the RS and the MS, and the RS can only be in the receiving state. The GAP in RS Frame is the sending-receiving conversion time of the RS, and a certain sending-receiving conversion interval is also reserved between the downlink frame and the uplink frame. In a 16 m DL Relay Zone, reception from BS is represented by Rx From BS; in a 16 m UL Relay Zone, sending to BS is represented by Tx To BS.

That is to say, for the downlink frame, the slot resources of the DL Relay Zone can only be allocated to the link from BS to RS or from BS to user, at this moment, RS is only in the receiving state; the slot resources of the DL Access Zone can only be allocated to the receiving link of the user from BS or RS, at this moment, RS is only in the sending state. The relay user can implement the multi-hop transmission of information by using properly arranged slot resources in the two zones.

8.2. OFDMA Parameters

TABLE 13

OFDMA air interface parameters

| Parameter | Description | Value |
|---|---|---|
| $N_{FFT}$ | Number of points in full FFT | 1024 |
| $F_S$ | Sampling frequency | 11.2 MHz |
| $\Delta_f$ | Subcarrier spacing | 10.9375 kHz |
| $T_o = 1/\Delta_f$ | OFDMA symbol duration without cyclic prefix | 91.43 us |
| CP | Cyclic prefix length (fraction of $T_o$) | ⅛ |
| $T_s$ | OFDMA symbol duration with cyclic prefix | 102.86 us for CP = ⅛ |
| $T_F$ | Frame length | 5 ms |
| $N_F$ | Number of OFDMA symbols in frame | 47 |
| $R_{DL-UL}$ | Ratio of DL to UL (TDD mode) | Full buffer data only: 29 symbols:18 Symbols |
| $T_{duplex}$ | Duplex time | TTG: 296 PS for 10 MHz RTG: 168 PS for 10 MHz PS = 4/$F_S$ |
| $DL_{Perm}$ | DL permutation type | PUSC |

Embodiment 7

Embodiment 7 is an example of the secondary route selection of the terminal. During the initial network entry procedure, according to the instruction of the current control station, the terminal can access another control station, wherein the instruction above can be sent by the current control station actively, also can be sent by the current control station in response to a request from the terminal. For example, the instruction above can be a Ranging response message. The control station obtains the channel quality information from a Ranging request code or a Ranging request message of the terminal and determines whether to notify the terminal to perform the secondary route selection. The terminal does not necessarily complete the whole process of initial network entry at the first control station.

Apparatus Embodiment

Figure 12:
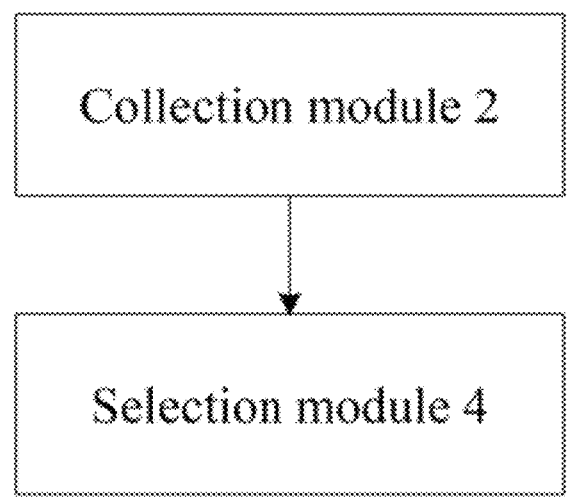
FIG. 12 shows a structure diagram of an apparatus for establishing a service route according to an embodiment of the present invention.

FIG. 12 shows a structure diagram of an apparatus for establishing a service route according to the embodiment of the present invention. As shown in FIG. 12, the apparatus comprises: a collection module 2 and a selection module 4. The structure is described hereinafter.

The collection module 2 is configured to collect channel quality information of all links on each path of a terminal; the selection module 4, coupled with the collection module 2, is configured to select an access station which establishes a route with the terminal according to the channel quality information.

The process of the selection module 4 can be implemented by a control station, also can be implemented by a terminal which then reports a selection result to the control station.

Specifically, the collection of the channel quality information by the collection module 2 occurs when the terminal performs a secondary route selection, initiates a service, initiates a handover, or initiates a network re-entry, in which, the process of the terminal performing the secondary route selection comprises: during the initial network entry, according to the instruction of the control station, the terminal accessing another control station. The channel quality information collected by the collection module 2 in the control station comprises SINR.

When the terminal performs a secondary route selection or initiates a handover, the process of the selection module 4 comprises:

according to the SINR, slot utilization efficiency is determined through the following formula:

$$\eta(SINR) = \frac{48 \times m \times r}{T_{frame}} (Kbps/\text{Slot}),$$

wherein $\eta(SINR)$ represents the slot utilization efficiency, m represents a modulation parameter, r represents a coding rate, $T_{frame}$ represents a frame length;

the access station corresponding to the maximum slot utilization efficiency determined according to the channel quality information is selected as the access station which establishes a route with the terminal.

After the selection module 4 selects an access station which establishes a route with the terminal according to the channel quality information, the terminal initiates a service request to the selected access station; it is judged whether the access station is a BS or an RS; if the access station is a BS, the terminal sends communication data to the BS; if the access station is an RS, it is further judged whether the Local Forwarding mode is started, if it is started, the Local Forwarding mode is adopted to perform communication in the condition that the current access station of the terminal and the current access station of a terminal communicating with the terminal are the same RS; if it is not started, the terminal sends communication data to the BS.

When the terminal performs a secondary route selection, initiates a handover with no service or initiates a network re-entry with no service, the process of the selection module 4 comprises: the access station corresponding to the maximum SINR determined according to the channel quality information is selected as the access station which establishes a route with the terminal.

When the terminal initiates a service, initiates a handover with a service or initiates a network re-entry with a service, the process of the selection module 4 comprises further comprises: the access station which establishes a route with the terminal is selected according to the SINR and a service rate; the specific process is as follows:

(1) According to the SINR and the service rate, a first selection threshold is determined through the following formula: C(m,n)=C(m)+C(n), wherein $$C(m) = \min_{0 \le l_m \le n_p - 1} \{C_{l_m}(m)\},$$

$$C(n) = \min_{0 \le l_n \le n_p - 1} \{C_{l_m}(n)\}, \quad C_l(u) = \sum_{i=1}^{h_l} \left\lceil \frac{R(u)}{\eta(SINR_l^i(n))} \right\rceil,$$

m and n represent two paths of the terminal respectively, $\lceil \Box \rceil$ represents taking a minimum integer greater than the expression, $$\left\lceil \frac{R(u)}{\eta(SINR_l^i(u))} \right\rceil$$

represents the number of slots needed to be allocated when a terminal u transmits data on the $i^{th}$ hop of link of a path $P_l(u)$ with a service rate of R(u).

(2) According to the SINR and the service rate, a second selection threshold is determined through the following formula:

$$C'(m, n) = \min_{1 \le l \le n_p - 1} \{C'_l(m, n)\},$$

wherein $$C'_l(m, n) = \left\lceil \frac{R(m)}{\eta(SINR_l^{h_i}(m))} \right\rceil + \left\lceil \frac{R(n)}{\eta(SINR_l^{h_i}(n))} \right\rceil,$$

wherein $\lceil \Box \rceil$ represents taking a minimum integer greater than the expression, $$\left\lceil \frac{R(u)}{\eta(SINR_l^i(u))} \right\rceil$$

represents the number of slots needed to be allocated when a terminal u transmits data on the $i^{th}$ hop of link of a path $P_l(u)$ with a service rate of R(u).

(3) the first selection threshold is compared with the second selection threshold; if the first selection threshold is greater than the second selection threshold, the BS is selected as the access station which establishes a route with the terminal; if the first selection threshold is less than or equal to the second selection threshold, the RS is selected as the access station which establishes a route with the terminal.

Preferably, before the selection module 4 selects an access station which establishes a route with the terminal according to the channel quality information, it is judged whether the Local Forwarding mode is supported, if the Local Forwarding mode is supported, it is further judged whether the Local Forwarding mode is started, if the Local Forwarding mode is started, the process of the selection module 4 is performed.

By virtue of the present invention, when the terminal performs a secondary route selection or initiates a handover, a control station collects channel quality information of all links on each path of a terminal, and an access station which establishes a route with the terminal is selected according to the channel quality information, thus the problem that an access station which establishes a route with the terminal can not be selected according to the actual application situation is solved, the selection of an access station which establishes a route with the terminal according to the actual application situation is realized.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A method for establishing a service route, comprising the steps of:

a control station collecting channel quality information of all links on each path of a terminal; and selecting, according to the channel quality information, an access station which establishes a route with the terminal;

wherein the channel quality information collected by the control station comprises: an SINR, when the terminal initiates a service, initiates a handover with a service or initiates a network re-entry with a service, the step of selecting the access station which establishes the route with the terminal according to the channel quality information further comprises a step of:

selecting the access station which establishes the route with the terminal according to the SINR and a service rate;

wherein the step of selecting the access station which establishes the route with the terminal according to the SINR and the service rate comprises the steps of:

determining, according to the SINR and the service rate, a first selection threshold through the following formula: C(m,n)=C(m)+C(n), wherein $$C(m) = \min_{0 \le l_m \le n_p - 1} \{C_{l_m}(m)\}, \quad C(n) = \min_{0 \le l_n \le n_p - 1} \{C_{l_n}(n)\},$$

$$C_l(u) = \sum_{i=1}^{h_l} \left\lceil \frac{R(u)}{\eta(SINR_l^i(u))} \right\rceil,$$

wherein m and n respectively represent different terminals, $\lceil \Box \rceil$ represents taking a minimum integer greater than the expression, $$\left\lceil \frac{R(u)}{\eta(SINR_l^i(u))} \right\rceil$$

represents the number of slots needed to be allocated when the terminal u transmits data on the $i^{th}$ hop of link of a path $P_l(u)$ with the service rate of R(u);

determining, according to the SINR and the service rate, a second selection threshold through the following formula:

$$C'(m, n) = \min_{1 \le l \le n_p - 1} \{C''_l(m, n)\},$$

wherein $$C'_l(m, n) = \left\lceil \frac{R(m)}{\eta(SINR_l^{h_i}(m))} \right\rceil + \left\lceil \frac{R(n)}{\eta(SINR_l^{h_i}(n))} \right\rceil,$$

wherein $\lceil \square \rceil$ represents taking a minimum integer greater than the expression, $$\left\lceil \frac{R(u)}{\eta(SINR_l^{h_i}(i))} \right\rceil$$

represents the number of slots needed to be allocated when a terminal u transmits data on the $i^{th}$ hop of link of a path $P_l(u)$ with the service rate of R(u);

comparing the first selection threshold with the second selection threshold;

if the first selection threshold is greater than the second selection threshold, selecting a base station as the access station which establishes the route with the terminal;

if the first selection threshold is less than or equal to the second selection threshold, selecting a relay station as the access station which establishes the route with the terminal.

2. The method according to claim 1, wherein the step of the control station collecting the channel quality information occurs when the terminal performs a secondary route selection, initiates a service, initiates a handover, or initiates a network re-entry, wherein the process of the terminal performing the secondary route selection comprises: during an initial network entry, the terminal accessing another control station according to an instruction of the control station.

3. The method according to claim 1, wherein the channel quality information collected by the control station comprises: an SINR, when the terminal performs a secondary route selection, initiates a handover with no service or initiates network re-entry with no service, the step of selecting the access station which establishes a route with the terminal according to the channel quality information comprises a step of:

selecting an access station corresponding to a maximum SINR determined according to the channel quality information as the access station which establishes the route with the terminal.

4. The method according to claim 1, wherein before the step of selecting the access station which establishes the route with the terminal according to the channel quality information, the method further comprises the steps of:

judging whether a Local Forwarding mode is supported;

if it is judged that the Local Forwarding mode is supported, further judging whether the Local Forwarding mode is started;

if it is judged that the Local Forwarding mode is started, performing the step of selecting the access station which establishes the route with the terminal according to the channel quality information.

5. The method according to claim 1, wherein the step of selecting the access station which establishes the route with the terminal according to the channel quality information comprises one of the following:

the control station selecting, according to the channel quality information, the access station which establishes the route with the terminal;

the terminal selecting, according to the channel quality information, the access station which establishes the route with the terminal, and reporting a selection result to the control station.

6. The method according to claim 1, wherein the control station comprises one of the following network elements: a macro base station, a micro base station, a pico base station and a relay station.

7. The method according to claim 1, wherein the channel quality information collected by the control station comprises: a Signal Interference Noise Ratio (SINR), when the terminal performs a secondary route selection or initiates a handover, the step of selecting the access station which establishes the route with the terminal according to the channel quality information comprises the steps of:

determining, according to the SINR, a slot utilization efficiency through the following formula:

$$\eta(SINR) = \frac{48 \times m \times r}{T_{frame}} (Kbps/\text{Slot}),$$

wherein $\eta(SINR)$ is the slot utilization efficiency, m is a modulation parameter, r is a coding rate, and $T_{frame}$ is a frame length; and selecting an access station corresponding to a maximum slot utilization efficiency determined according to the channel quality information as the access station which establishes the route with the terminal.

8. The method according to claim 7, wherein after the step of selecting the access station which establishes the route with the terminal according to the channel quality information, the method further comprises the steps of:

the terminal initiating a service request to the selected access station;

judging whether the access station is a base station or a relay station;

if the access station is a base station, the terminal sending communication data to the base station;

if the access station is a relay station, further judging whether a Local Forwarding mode is started, if it is judged that the Local Forwarding mode is started, adopting, in a condition that a current access station of the terminal and a current access station of a terminal communicating with the terminal are the same relay station, the Local Forwarding mode to perform communication, it is judged that the Local Forwarding mode is not started, the terminal sending communication data to the base station.

9. The method according to claim 7, wherein the step of selecting the access station which establishes the route with the terminal according to the channel quality information comprises one of the following:

the control station selecting, according to the channel quality information, the access station which establishes the route with the terminal;

the terminal selecting, according to the channel quality information, the access station which establishes the route with the terminal, and reporting a selection result to the control station.

10. The method according to claim 2, wherein the step of selecting the access station which establishes the route with the terminal according to the channel quality information comprises one of the following:

the control station selecting, according to the channel quality information, the access station which establishes the route with the terminal;

the terminal selecting, according to the channel quality information, the access station which establishes the route with the terminal, and reporting a selection result to the control station.

11. The method according to claim 8, wherein the step of selecting the access station which establishes the route with the terminal according to the channel quality information comprises one of the following:

the control station selecting, according to the channel quality information, the access station which establishes the route with the terminal;

the terminal selecting, according to the channel quality information, the access station which establishes the route with the terminal, and reporting a selection result to the control station.

12. The method according to claim 3, wherein the step of selecting the access station which establishes the route with the terminal according to the channel quality information comprises one of the following:

the control station selecting, according to the channel quality information, the access station which establishes the route with the terminal;

the terminal selecting, according to the channel quality information, the access station which establishes the route with the terminal, and reporting a selection result to the control station.

13. The method according to claim 4, wherein the step of selecting the access station which establishes the route with the terminal according to the channel quality information comprises one of the following:

the control station selecting, according to the channel quality information, the access station which establishes the route with the terminal;

the terminal selecting, according to the channel quality information, the access station which establishes the route with the terminal, and reporting a selection result to the control station.

14. An apparatus used for carrying out the method of claim 1, wherein the apparatus comprises the control station and a selection module, wherein the selection module is configured to select the access station according to the method of claim 1.

15. A control station, configured to collect channel quality information of all links on each path of a terminal; and select, according to the channel quality information, an access station which establishes a route with the terminal;

wherein the channel quality information collected by the control station comprises: an SINR, when the terminal initiates a service, initiates a handover with a service or initiates a network re-entry with a service, the step of selecting the access station which establishes the route with the terminal according to the channel quality information further comprises a step of:

selecting the access station which establishes the route with the terminal according to the SINR and a service rate;

wherein the step of selecting the access station which establishes the route with the terminal according to the SINR and the service rate comprises the steps of:

determining, according to the SINR and the service rate, a first selection threshold through the following formula: $C(m,n)=C(m)+C(n)$, wherein $$C(m) = \min_{0 \leq l_m \leq n_p - 1} \{C_{l_m}(m)\}, C(n) = \min_{0 \leq l_n \leq n_p - 1} \{C_{l_n}(n)\},$$

$$C_l(u) = \sum_{i=1}^{h_l} \left\lceil \frac{R(u)}{\eta(SINR_l^i(u))} \right\rceil,$$

wherein m and n respectively represent different terminals, $\lceil \Box \rceil$ represents taking a minimum integer greater than the expression, $$\left\lceil \frac{R(u)}{\eta(SINR_l^i(u))} \right\rceil$$

represents the number of slots needed to be allocated when the terminal u transmits data on the $i^{th}$ hop of link of a path $P_l(u)$ with the service rate of $R(u)$;

determining, according to the SINR and the service rate, a second selection threshold through the following formula:

$$C'(m, n) = \min_{1 \leq l \leq n_p - 1} \{C_l''(m, n)\},$$

wherein $$C_l'(m, n) = \left\lceil \frac{R(m)}{\eta(SINR_l^{h_i}(m))} \right\rceil + \left\lceil \frac{R(n)}{\eta(SINR_l^{h_i}(n))} \right\rceil,$$

wherein $\lceil \Box \rceil$ represents taking a minimum integer greater than the expression, $$\left\lceil \frac{R(u)}{\eta(SINR_l^i(i))} \right\rceil$$

represents the number of slots needed to be allocated when a terminal u transmits data on the $i^{th}$ hop of link of a path $P_l(u)$ with the service rate of $R(u)$;

comparing the first selection threshold with the second selection threshold;

if the first selection threshold is greater than the second selection threshold, selecting a base station as the access station which establishes the route with the terminal;

if the first selection threshold is less than or equal to the second selection threshold, selecting a relay station as the access station which establishes the route with the terminal.

16. A terminal, configured to select, according to channel quality information, an access station which establishes a route with the terminal, and report a selection result to a control station;

wherein the channel quality information collected by the control station comprises: an SINR, when the terminal initiates a service, initiates a handover with a service or initiates a network re-entry with a service, the step of selecting the access station which establishes the route with the terminal according to the channel quality information further comprises a step of:

selecting the access station which establishes the route with the terminal according to the SINR and a service rate;

wherein the step of selecting the access station which establishes the route with the terminal according to the SINR and the service rate comprises the steps of:

determining, according to the SINR and the service rate, a first selection threshold through the following formula: C(m,n)=C(m)+C(n), wherein $$C(m) = \min_{0 \le l_m \le n_p - 1} \{C_{l_m}(m)\}, C(n) = \min_{0 \le l_n \le n_p - 1} \{C_{l_n}(n)\},$$

$$C_l(u) = \sum_{i=1}^{h_l} \left\lceil \frac{R(u)}{\eta(SINR_l^i(u))} \right\rceil,$$

wherein m and n respectively represent different terminals, $\lceil \Box \rceil$ represents taking a minimum integer greater than the expression, $$\left\lceil \frac{R(u)}{\eta(SINR_l^i(u))} \right\rceil$$

represents the number of slots needed to be allocated when the terminal u transmits data on the $i^{th}$ hop of link of a path $P_l(u)$ with the service rate of R(u);

determining, according to the SINR and the service rate, a second selection threshold through the following formula:

$$C'(m, n) = \min_{1 \le l \le n_p - 1} \{C''_l(m, n)\},$$

wherein $$C'_l(m, n) = \left\lceil \frac{R(m)}{\eta(SINR_l^{h_l}(m))} \right\rceil + \left\lceil \frac{R(n)}{\eta(SINR_l^{h_l}(n))} \right\rceil,$$

wherein $\lceil \Box \rceil$ represents taking a minimum integer greater than the expression, $$\left\lceil \frac{R(u)}{\eta(SINR_l^i(i))} \right\rceil$$

represents the number of slots needed to be allocated when a terminal u transmits data on the $i^{th}$ hop of link of a path $P_l(u)$ with the service rate of R(u);

comparing the first selection threshold with the second selection threshold;

if the first selection threshold is greater than the second selection threshold, selecting a base station as the access station which establishes the route with the terminal;

if the first selection threshold is less than or equal to the second selection threshold, selecting a relay station as the access station which establishes the route with the terminal.

* * * * *